United States Patent [19]

Pospischil et al.

[11] 4,056,790

[45] Nov. 1, 1977

[54] TRANSMISSION SYSTEM FOR PULSE SIGNALS

[75] Inventors: Reginhard Pospischil, Lochham; Josef Dömer, Hohenschaftlarn, both of Germany

[73] Assignee: Siemens Aktiengesellschaft, Berlin & Munich, Germany

[21] Appl. No.: 598,724

[22] Filed: July 24, 1975

Related U.S. Application Data

[63] Continuation of Ser. No. 425,162, Dec. 17, 1973, abandoned.

[30] Foreign Application Priority Data

Dec. 18, 1972 Germany .............................. 2261840

[51] Int. Cl.² .............................................. H04B 3/30
[52] U.S. Cl. ......................................... 333/5; 174/36; 179/78 R; 333/12
[58] Field of Search ................. 333/1, 12, 5; 307/105; 325/475; 179/78 R; 174/36

[56] References Cited

U.S. PATENT DOCUMENTS

| | | | |
|---|---|---|---|
| 2,245,492 | 6/1941 | Meyer | 333/12 X |
| 2,865,006 | 12/1958 | Sabaroff | 333/12 X |
| 3,681,612 | 8/1972 | Vogl et al. | 333/12 X |

FOREIGN PATENT DOCUMENTS

304,229   2/1930   United Kingdom .................. 333/12

*Primary Examiner*—Paul L. Gensler
*Attorney, Agent, or Firm*—Hill, Gross, Simpson, Van Santen, Steadman, Chiara & Simpson

[57] ABSTRACT

This invention relates to a transmission system for transmitting electrical signals whereby the conductor path consists of several sections of a cable which contain a number of twin conductors and wherein inductances are inserted at fairly great distances in the form of bifilar chokes at least for the double conductors so as to cause unbalanced to ground currents to be essentially damped.

7 Claims, 12 Drawing Figures

TRANSMISSION SYSTEM FOR PULSE SIGNALS

This is a continuation of application Ser. No. 425,162, filed Dec. 17, 1973 now abandoned.

BACKGROUND OF THE INVENTION

1. Field of the Invention

This invention relates in general to transmission systems and in particular to a novel transmission system for attenuating unbalanced to ground currents in a transmission line.

2. Description of the Prior Art

Transmission systems are shown for example in U.S. Pat. No. 1,915,442. When PCM-Technique was introduced at the local level of telephone networks the problem of assuring safe transmission of signals with minimum cable cost became important. When pair of conductors are used in the form of doubles or quadruples which are assembled to form a large group of conductors, cross-talk between the individual pair of lines has an interfering effect due to the coupling of pulses from one pair of conductors into another pair of conductors within the regenerator and thus originally trnsmitted pulse information can be erroneously detected. For this reason it has been necessary to apply only a group of pair of lines for one transmission direction in other words those transmitting intelligence in the out-going direction and to have another separate pair of conductor group which is used in the receiving direction. Although the groups may be put into one cable it is common to use separate cables, however, cross-talk interference is still present and constitutes a problem. One solution which is very expensive is to use separate coaxial conductor cables instead of cables containing ground symmetric double conductors. However such approach is much more expensive than utilizing cables.

SUMMARY OF THE INVENTION

The invention is based on the manner in which cables are used so as to eliminate cross-talk in normal ground symmetric double conductor techniques for the transmission of pulse signals and particularly PCM signals of a high pulse repetition frequency without interference. In the present invention pulse repetition frequencies as high as 4 through 8MHz can be transmitted or even pulses as high as 15 through 20 or even 35 megahertz can be transmitted through cables without interferring cross-talk.

In the present invention this problem is solved by utilizing a cable which contains at least two groups of conductors each of which has symmetrical pairs of conductors in the common arrangement of pairs of quadruples and whereby preferably the individual group is decoupled with respect to the other group with the help of a shielding screen which surrounds a particular group and also the use of individual bi-filar chokes which consist of short sections of individual double conductors which include a small ferrite tube inserted into it in such a way that it includes this short section.

The invention is of particular importance for group screened symmetrical cables containing at least four screened groups and whereby each group consists of symmetrical wire pairs or wire groups, for instance in the form of star quadruples and whereby the individual wire pairs or wire groups of a bundle have different lengths of twist in order to lower the cross-talk.

German Pat. No. 1,159,527 illustrates a system for the suppression of synchronously flowing currents in a high frequency double conductor which consists of a certain section of the double conductor used in connection with a small ferrite tube attached thereto. With such a system however the inventor was not concerned at all with the solution of the problem of the junction between a symmetrical line and an unsymmetrical line or the problem of a resistance transforming conductor transmitter. On the other hand, the present invention is concerned with lowering the cross-talk between the pairs of conductors of a conductor group to a substantial extent mainly for the case of the operation of this conductor group with PCM signals of a high pulse repetition frequency. The invention is based upon the recognition that the cross-talk of conductor groups operated in such a system is mainly due to distortion via third circuits as for example ring circuits and that particular interferences of this kind is due to the formation of ground unsymmetrical conductor currents with respect to the pairs of conductors which influence and cause cross-talk.

It has proven to be particularly advantageous when the ferrite tube is embodied in such a way that its length and cross-sectional dimension depending on the properties of the particular ferrite ferro-magnetic material which is being used are selected such that a value will result for the inductance caused by the small ferrite tube with respect to the unbalanced to ground conductor currents which at least approximately coincides with the following equation:

$$L = \frac{Z}{m \cdot \pi \cdot f_2 \cdot (1 + \frac{1}{N})} \left\{ 4 \left( \frac{f_2}{f_1} \right)^2 \cdot \frac{l_2}{l_1} \cdot 10^{\frac{a_{f_1} - a_1 - 2(n + a_{s_1} - a_{u_1}) - (a_{u_2} - a_2)}{10}} - 1 \right\}^{\frac{1}{2}}$$

$Z$ = Wave resistance for the unsymmetric wave type (usually 60 Ohm)

$m$ = Number of places of insertion [switching-on places] of bi-filar chokes in a continuous conductor path of length $l_2$ $l_1$ = Reference lengths (cable lengths considered, such as a production length)

$f_1$ = Reference frequency, in particular 1 MHz $f_2$ = Highest frequency to be transmitted, whereby the cross-talk demands must be considered, for instance 17 MHz $N$ = Number of pairs within a bundle decreased by $l$ $n$ = 10lg [log]N $a_{f_1}$ = direct cross-talk at the frequency $f_1$ via the conductor length $l_1$ $a_1$ = Operational damping of the symmmetrically operated pair at the frequency $f_1$ via the conductor length $l_1$ $a_{s_1}$ = Damping of the interference [coupling over] from the ground-symmetric into the ground unsymmetric wave type at the frequency $f_1$ of a pair via the conductor length $l_1$ $a_{u_1}$ = Operational damping for a ground-unsymmetric transmission wire a pair of the section length $l_1$ at the frequency $f_1$ $a_{u_2}$ = Operational damping for a ground-unsymmetric transmission wire a pair of the section length $l_2$ at the frequency $f_2$ $a_2$ = Operational damping in a pair via the section length $l_2$ at the frequency $f_2$ The value for L for the double cable mentioned above is generally between 3 through 9 micro-henries using a cable length between the switching points of approximately between 100 meters up to 1 kilometer.

It is of particular advantage when the bi-filar chokes in the transmission line are arranged at the junction points of the individual conductor sections which are usually connected into the cable by means of splicings. In this case it is particularly advantageous if the individual small ferrite tube is divided into two parts and if one part is plugged into one of the pair ends and the other is plugged into the other pair ends which are to be innerconnected. Consequently the two pairs are interconnected by soldering or welding.

The ferrite tubes also assure that the required insulation distance between adjacent pairs is maintained.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure, and in which

DESCRIPTION OF THE PREFERRED EMBODIMENT

For detailed explanation of the invention consider the following. For group screened symmetrical cable discussed above which operates with 120 or 480 PCM channels the cross-talk damping between wire pairs of different groups is very good both when transmitting 120 PCM channels as well as for the transmission of 480PCM channels. This is for close cross-talk damping. On the other hand, the far cross-talk damping between wire pairs of a group is only sufficient to allow transmission of 120 PCM channels. The far end cross-talk spacing in the case of a chain connection of several cables one behind the other as they are actually laid out in practice decreases much greater than expected with increasing frequency and increasing length, although the individual production length alone has very good crosstalk attenuation. In the case of symmetrical wire pairs, the far cross-talk distance should decrease with increasing frequency at 6 dB (decibel) per octave and in the case of increasing length at 3 decibel per length coupling.

Under these conditions the far cross talk distance follows the following equation:

$$a_f - a = a_{f_1} - a_1 - 10 \lg \left\{ (\frac{f}{f_1})^2 \cdot \frac{l}{l_1} \right\} \quad (1)$$

wherein $f_1$ is the reference frequency, $l_1$ is the reference length, $a_{f_1} - a_1$ is the far cross-talk distance between two symmetrical circuits of length $l_1$ measured at the reference frequency $f_1$.

If the far cross distance is measured for a cable at the individual production lengths, it will still approximately follow the equation (1).

Figure 1:
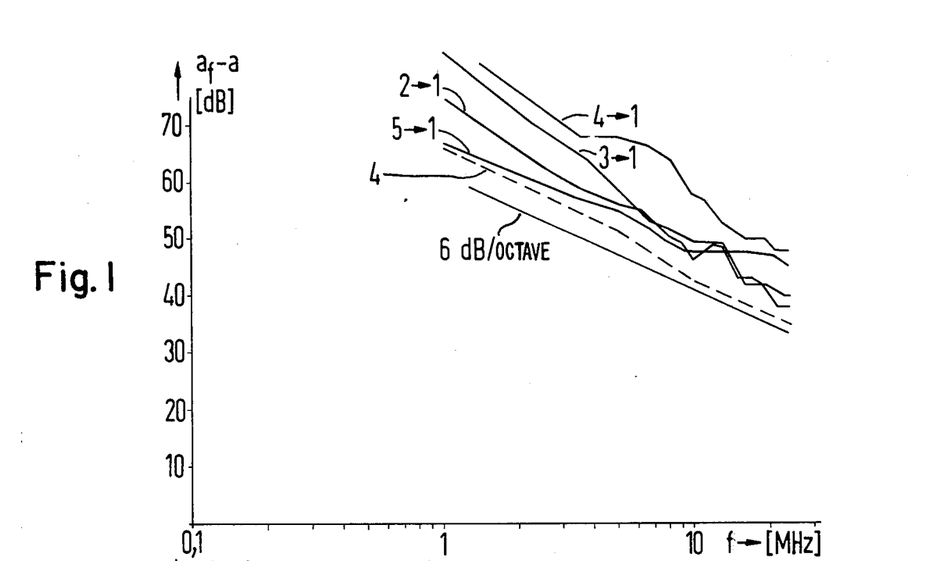
FIG. 1 is a plot of frequency-dB.

FIG. 1 is a plot of the results obtained by measuring a cable at a function of frequency $f$, for instance for the group 1 at a cable length of 890 meters for the far cross-talk distance $a_f - a$. The curve 2→1 relates to the case of the adaptation of the measuring transmitter to wire pair 2 and the measuring receiver to wire pair 1. In FIG. 1 the first number associated with each of the figures identifies the wire pair to which the measuring transmitter is connected and the second number following the arrow represents the wire pair to which the measuring receiver is connected. The dashed line is a plot of the sum total of the four interferences with respect to wire pair 1. The 6 decibel per octave line has also been shown in FIG. 1.

Figure 2:
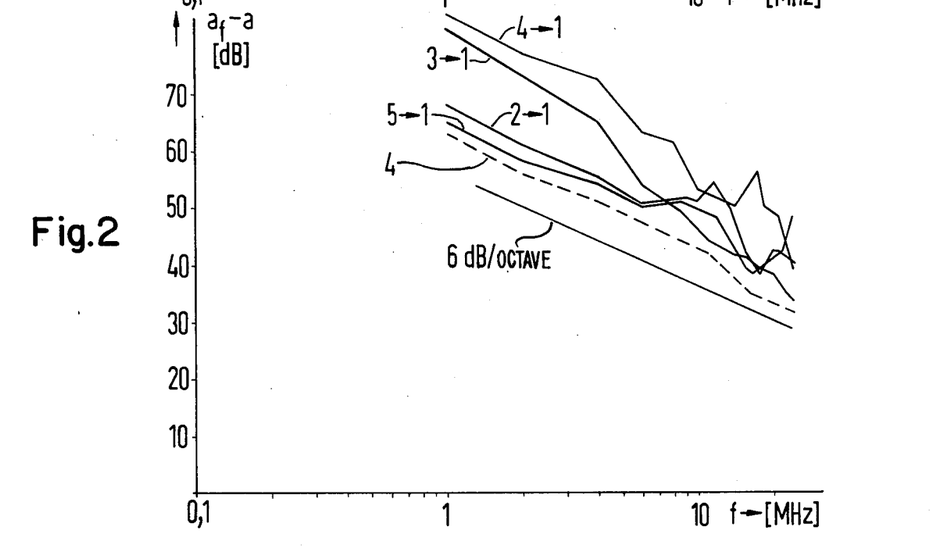
FIG. 2 is a plot of frequency versus dB.
Figure 3:
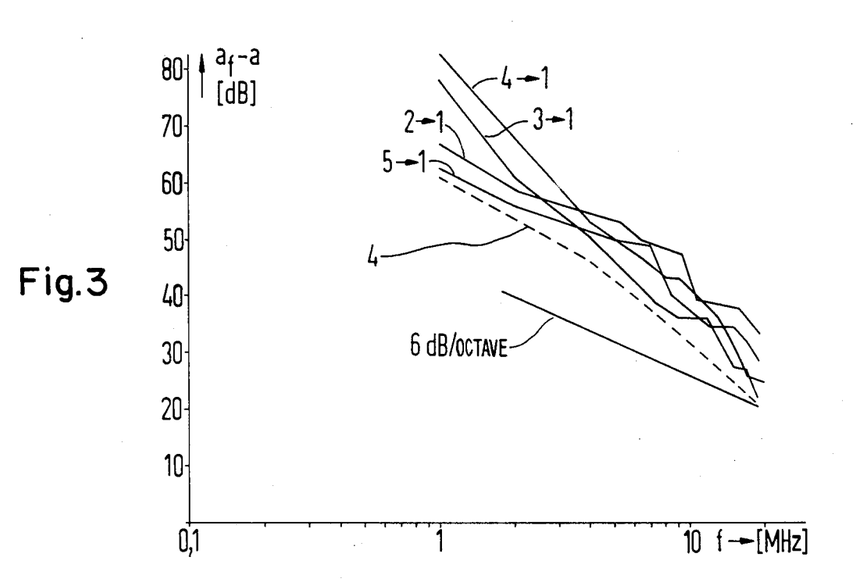
FIG. 3 is a plot of frequency versus dB.

FIG. 2 illustrates the case where two groups are connected in series and a steeper decrease will be obtained above 10 MHz in the case of an increasing frequency. The interfering curve for 4 interferers with respect to wire pair 1 is shown as well of the 6 dB per octave curve. FIG. 3 illustrates the series connection of three groups and it is seen that even a steeper decrease commences even at 4 MHz.

The sum of the far cross-talk damping in a series circuit of three groups at 17 MHz is only 22.5 decibels, for example.

The results of tests upon which this invention is based showed that due to non-symmetry of a wire-pair, an unsymmetrical longitudinal current exists upon the wire pair and all of the remaining wire pairs of the group serve as a return conductor for such unsymmetrical current. That part of the unsymmetrical reverse current which flows via a second pair of wires will then penetrate into the symmetrical circuit via the unsymmetry of the wire pair and will result in cross-talk. The operational damping is substantially less for the current flowing within the unsymmetrical circuit than for the useful signal in the symmetrical circuit since the unsymmetrical current has a parallel connection of the conductors of a wire pair in one direction and in the opposite direction the parallel connection of all the remaining conductors. By the insertion according to the invention of bi-filarly wound chokes which are uneffective on the symmetrical circuit however the operational damping of an unsymmetrical circuit can be increased without changing the transmission properties of the symmetrical circuit.

Tests have been made upon which this invention is based which have determined the most advantageous properties of the chokes. During the measurement of cables without chokes, as for example, as shown in FIG.

3 the far cross-talk distance will extend according to equation (2).

$$a_f - a = a_{f_1} - a_1 - 10 \lg \left\{ (\frac{f}{f_1})^2 \cdot \frac{l}{l_1} \right\} - 10 \lg \Delta \quad (2)$$

$$\Delta = 1 + (\frac{f}{f_1})^2 \cdot \frac{l}{l_1} \cdot 10^{\frac{a_{f_1} - a_1 - 2(n + a_{s_1} - a_{u_1}) - (a_u - a)}{10}} \quad (3)$$

Hereby:

$$n = 10 \lg N \quad (4)$$

(N is the number of symmetric wire pairs having the effect of a reverse conductor)

$a_{s_1}$ the symmetry damping of a symmetric wire pairs of lengths $l_1$ measured at the frequency $f_1$. The level $f_1$ will be symmetrically fed into the input of a symmetric pair for measuring $a_{s_1}$. The symmetric wire pairs are closed off on both sides by means of symmetry transmitters. The output level between the output-side symmetry center of the wire pair, into which [something] is symmetrically fed on the input side, and the parallel connection [circuit] of the symmetry center of all other wire pairs, $a_{u_1}$ the operation damping of the unsymmetric circuit [circle] in the case of an unsymmetric feeding and measuring at the frequency $f_1$ and the length $l_1$, $a_u$ the transmission damping of the unsymmetric circuits of length $l > l_1$, measured at the frequency $f > f_1$, $a$ the frequency- and length-depending damping of a symmetric wire pair during a symmetric measurement.

Equation (2) shows that the influence of the factor 10 lg on the far cross-talk damping can only be neglected as long as the following relationship holds:

$$1 \gg (\frac{f}{f_1})^2 \cdot \frac{l}{l_1} \cdot 10^{\frac{a_{f_1} - a_1 - 2(n + a_{s_1} - a_{u_1}) - (a_u - a)}{10}} \quad (5)$$

This condition will be fulfilled when the damping of the unsymmetrical circuits have been increased by means of inserting longitudinal inductances. If a choke with inductance $L_1$ is inserted into each pair of (N + 1) double wires and which is effective for the unsymmetrical circuits but is ineffective for the symmetrical circuits, the damping of the unsymmetrical circuit will be increased by $a_D$ where Z is the wave resistance of the unsymmetrical circuit.

$$a_D = 10 \lg \left\{ 1 + \left( \frac{\pi \cdot f \cdot L_1}{Z} (1 + \frac{1}{N}) \right)^2 \right\} \quad (6)$$

Since the junction points from the symmetrical circuit to any unsymmetrical circuit and from an unsymmetrical circuit to a further symmetrical circuit are distributed over the entire cable length it is advantageous if the choke inductance can be distributed over the entire length of the cable. If an inductance of magnitude L is inserted at m places into each double wire and the value of L is chosen to be $$L = \frac{L_1}{m} \quad (7)$$

and this value for $L_1$ is inserted into equation (6) and $a_u + a_D$ is inserted into equations (3) or (5) respectively for $a_u$, equation (3) will reduce to the form $$\Delta = 1 + (\frac{f}{f_1})^2 \cdot \frac{l}{l_1} \cdot \frac{10^{\frac{a_{f_1} - a_1 - 2(n + a_{s_1} - a_{u_1}) - (a_u - a)}{10}}}{1 + \frac{\pi \cdot f \cdot m \cdot L}{Z} \left(1 + \frac{1}{N}\right)^2} \quad (8)$$

If it be supposed that L is selected that such factor 10 lg Δ in equation (2) for the frequency $f_2$ and the length $l_2$ increases the far cross-talk distance only at one decibel a definite equation will be obtained for L.

$$L = \frac{Z}{m \cdot \pi \cdot f_2 \cdot (1 + \frac{1}{N})} \left\{ 4(\frac{f_2}{f_1})^2 \cdot \frac{l_2}{l_1} \cdot 10^{\frac{a_{f_1} - a_1 - 2(n + a_{s_1} - a_{u_1}) - (a_{u_2} - a_2)}{10}} - 1 \right\} \quad (9)$$

Measurements were made of the cross-talk conditions in a group B1 having a production length of 890 meters as well as the series connections of two groups B1 and B2 having length of 1780 meters and of three groups B1, B2 and B3 having a length of 2670 meters. The results of the individual group B1 is illustrated in FIG. 1.

Figure 4:
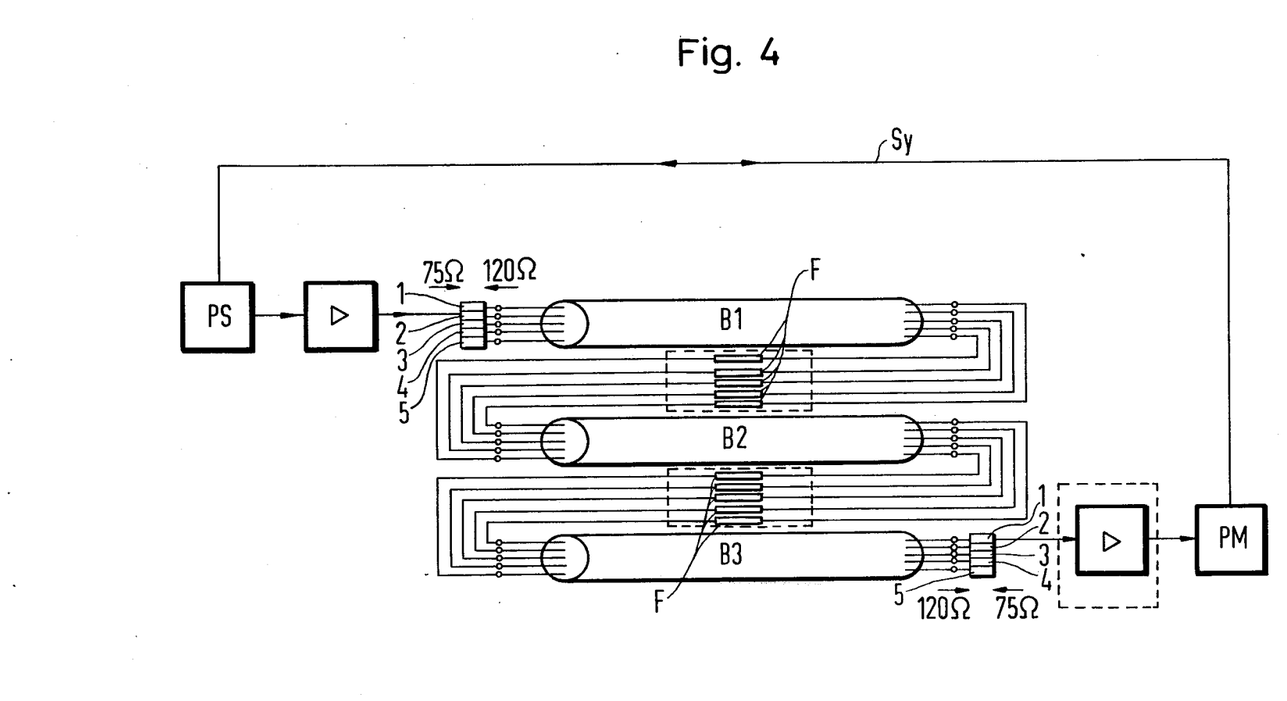
FIG. 4 is a schematic view of the invention.

FIG. 4 illustrates the measuring arrangement for the series connections. In FIG. 4 PS represents a variable frequency oscillator which can be tuned over the range from 100 KHz up to 100 MHz. An amplifier receives the output of the oscillator PS and supplies it to the impedance transformer which transforms the output impedance of the amplifier from 75 Ohms to 120 Ohms. The output of the amplifier has a signal level of +30 dBm at 75 Ohms.

The reference numerals 1 through 5 in the impedence transformer identify the pairs of the individual groups.

The signal passes through the series connective groups $B_1$, $B_2$, $B_3$ and to an output impedance transformer which converts the impedance from 120 to 75 Ohms. An output amplifier is connected to the output of this second impedance transformer and supplies an amplification of 45 Db. The amplifiers were magnetically shielded so as to eliminate interfering radiation. The output signal of the output amplifier is supplied to a selective level meter PM which is operated synchronously with a level oscillator by the line Sy as indicated.

Small ferrite cores F indicated by thick lines between the groups B1 and B2 and B3 respectively have been inserted near the splicing points particularly between the connection point between group B1 and group B2. Second group of ferrite cores F are connected at the connecting points between group B2 and group B3. These ferrite cores have an inductance value of approximately 4 micro H for the unsymmetrical currents on the individual pairs.

The results obtained by measuring the series connections without chokes is illustrated in FIGS. 2 and 3. If the group length of a group ($l_1 = 890$ mm) is selected as a reference length $l_1$ and $f_1$ is 1 MHz as a reference frequency, the values $a_{f_1} - a_1$ can be taken from FIG. 1 and the value of $a_{f_1} - a_1$ is 66 decibel.

Since $N = 4$ wire pairs serve as return lines for each unsymmetrical circuit the following should be inserted for $n$ in equation (4)

$$n = 10 \lg 4 = 6 \text{ decibel}$$

Figure 5:
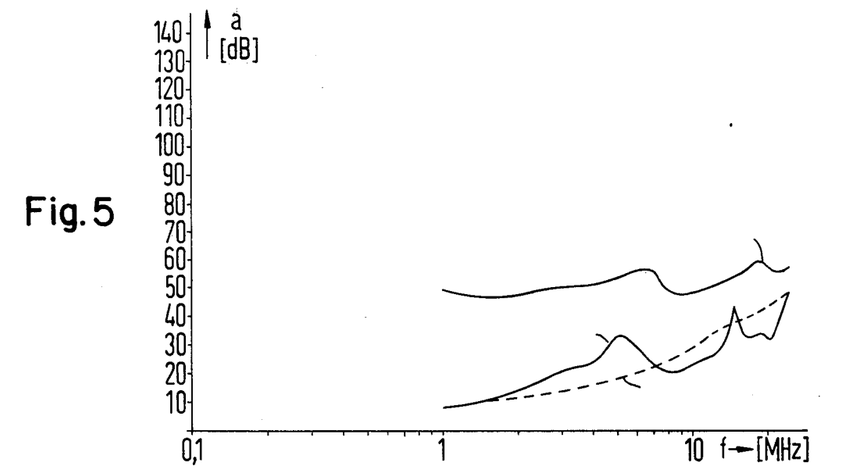
FIG. 5 is a plot of frequency-dB.

The value for the term $a_{s_1} - a_{u_1}$ can be obtained from the measurements in FIG. 5. Here for $f_1 = 1$ MHz the following value can be obtained, $a_{s_1} = 42$ decibel. Thus, the following equation is obtained:

$$a_{f_1} - a_1 - 2(n + a_{s_1} - a_{u_1}) = 30 \text{dB} \quad (10)$$

Figure 6:
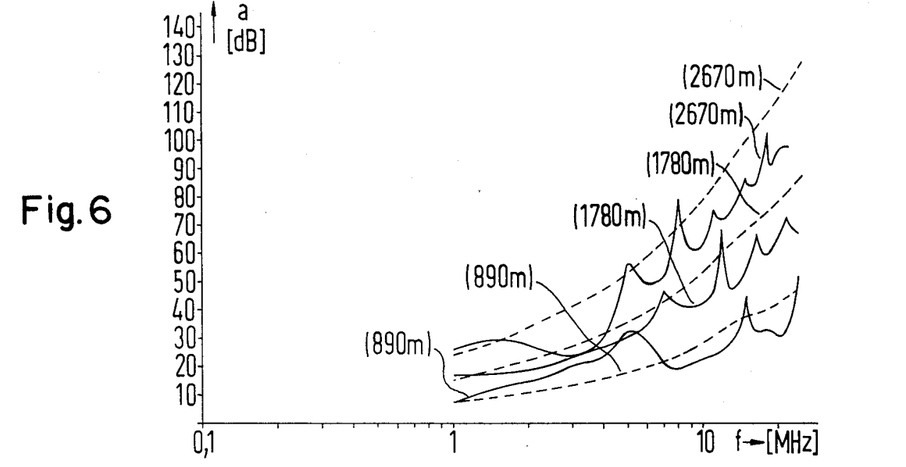
FIG. 6 is a plot of frequency-dB.

If the far cross-talk distance is assumed to be calculated at a frequency of 17 MHz for a length of $l_{21} = 890$ meters, $l_{22} = 1780$ meters and $l_{23} = 2670$ meters additional values of $a_{u_2} - a_2$ will be required which can be obtained from the curve of FIG. 6.

The following values will be obtained:

$$l_{21} = 890 \text{ m}: a_{u_2} - a_2 = -4 \text{ dB}$$

$$l_{22} = 1780 \text{ m}: a_{u_2} - a_2 = -8 \text{ dB}$$

$$l_{23} = 2670 \text{ m}: a_{u_2} - a_2 = -17 \text{ dB}$$

If the values thus found are inserted in equation (3), the following will be obtained:

a) $l_{21} = 890$ m
$\Delta_1 = 1 + 289 \cdot 10^{-2.6} = 1.72$
$10 \lg \Delta_1 = 2.37$ dB
b) $l_{22} = 1780$ m
$\Delta_2 = 1 + 579 \cdot 10^{-2.2} = 6.7$
$10 \lg \Delta_2 = 8.3$ dB
c) $l_{23} = 2670$ m
$\Delta_3 = 1 + 867 \cdot 10^{-1.8} = 44.3$
$10 \lg \Delta_3 = 16.5$ dB Above the first subscripts refers to a particular sample frequency thus in $l_{23}$, the subscript 2 refers to a frequency $f_2$ which was 17 MHz and the second "3" indicates the length $l$ and corresponds to 3 times the reference length which is $l = 890$m and thus $l_{23} = 2670$ m.

The far cross-talk distance according to equation (2) at 17 MHz will then be the following:
a. $l_{21} = 890$ m $$a_f - a = 66 - 26 - 2.37 = 37.6 \text{ dB}$$

The measured values, according to FIG. 1 are approximately 38 decibels.
b. $l_{22} = 1780$ m $$a_f - a = 66 - 27.6 - 8.3 = 30.1 \text{ dB}$$

The measured value according to FIG. 2 will be approximately 31 decibel.
c. $l_{23} = 2670$ m $$a_{f-a} = 66 - 29.4 - 16.5 = 21.9 \text{ dB}$$

According to FIG. 3, a value of 22.5 decibel was measured at a length of 2670 mm.

In all cases the calculated and measured values agreed very closely.

Substantial improvements in the cables were obtained by inserting inductances. First the required inductance L is obtained from equation (9) for a length of $l_{23} = 2670$ meters. One choke per wire pair should be inserted only at the junction points of 890 meters and 1780 meters ($mm = 2$). The cable has $N + 1 = 5$ double wires per group. The wave resistance in the unsymmetrical circuit amounts to $Z = 60$ Ohm. Thus the following value will be obtained for L from equation (9) for the frequency $f_2 = 17$ MHz:

$$L = \frac{60}{17 \cdot 2.5} \{4.867 \cdot 10^{-1.3} - 1\}^{\frac{1}{2}} \mu H$$

$$L = 5.9 \mu H \quad (11)$$

With this inductance the far cross-talk at 17 MHz and 2670 m would be degraduated only one decibel with respect to the theoretical ideal path. Thus the following can be expected:

$$a_f - a = 66 - 29.4 - 1 = 35.6 \text{ dB} \quad (12)$$

During the measurement tube cores with an inductance of 4 $\mu H$ per core were utilized. Using the inductance of 4 $\mu H$ the following values were obtained from equation (8)

$$\Delta = 1.55$$
$$10 \lg \Delta = 1.9 \text{ dB}$$

Thus the following can be expected for the far-cross tak distance:

$$a_f - a = 66 - 29.4 - 1.9 = 34.7 \text{ decibel} \quad (13)$$

Figure 7:
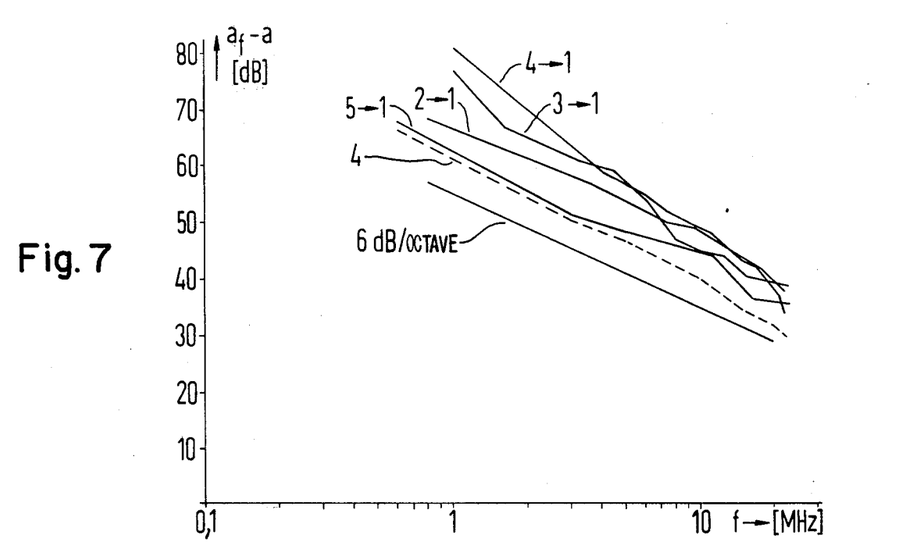
FIG. 7 is a plot of frequency-dB.

The measured results are illustrated in FIG. 7. The far cross-talk distance of 17 MHz as shown in FIG. 7 amounts to approximately 30.5 decibel. A fairly good coincidence exists between the theoretical and practical systems in particular when it is considered that the desired ideal results at 17 MHz even with individual cable members cannot be entirely maintained. A further improvement can be obtained when the inductance is subdivided at even more junction points.

Figure 8:
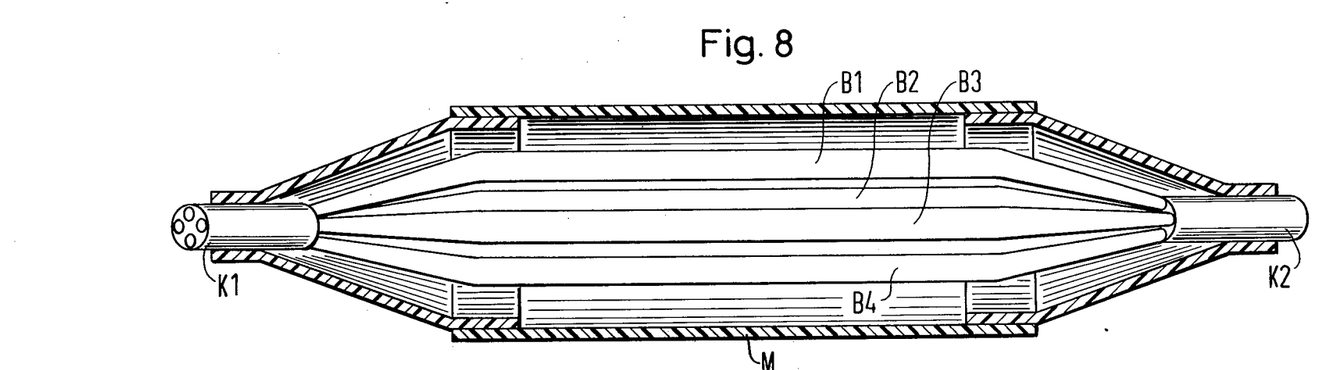
FIG. 8 is a sectional view of a transmission line junction.
Figure 9:
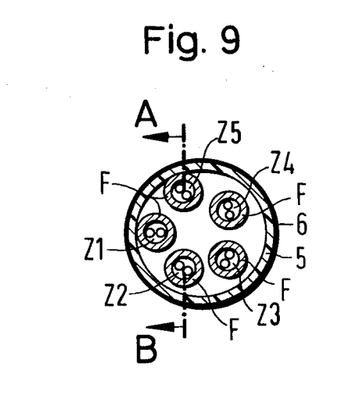
FIG. 9 is an end sectional view of the transmission line.
Figure 10:
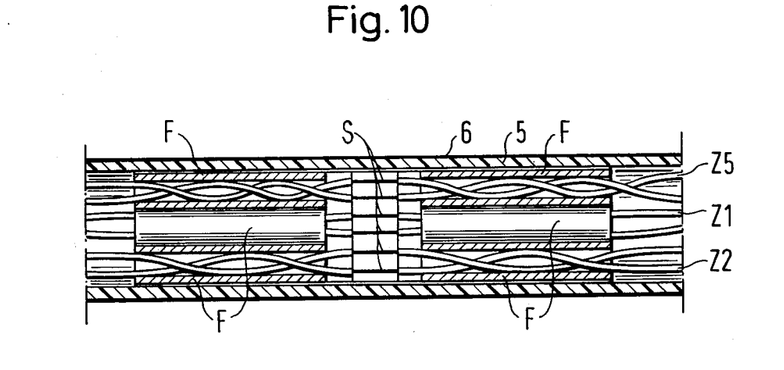
FIG. 10 is a sectional view taken along lines A–B in FIG. 9.

FIGS. 8 through 12 illustrate actual embodiments for connecting the bi-filar chokes. FIGS. 8, 9 and 10 disclose the longitudinal section of a cable sheath used for the connecting of two broad-band, close-traffic cables K1 and K2 enclosing respectively four groups B1, B2, B3 and B4. The cable sleeve M corresponds to the common embodiment available for example from the German firm of Siemens & Halske AG and shown in the brochure entitled "Connection and Branch Sleeves for polyethylen-coat Cable" publication No. 312/1020. The embodiment of the connection between the groups of the two cables K1 and K2 has been shown schematically in FIG. 9 and FIG. 10 illustrates the group B1 in a longitudinal and transverse section. The individual pairs are numbered Z1, Z2, Z3, Z4 and Z5. They are respectively provided with a common insulation within an insulator sleeve 5. The insulator sleeve 5 is covered by a copper foil 6 which is wound onto the insulator sleeve and which is characteristic for this type of cable. FIG. 10 shows the arrangement of the soldering point within the doubler and is through the section line AB illustrated in FIG. 9 through the doublers Z5 and Z2. The soldering itself of each of the pairs designated S is shown in FIG. 10; but it could, of course, be replaced by other common connection methods.

A small ferric core has been inserted into each pair respectively on either side of the connecting point which provides the additional advantage that it maintains the spacing distance between the individual pairs. The ferrite material of the cores F may be type B 62-110-A 8006 × 025 offered for sale by Siemens & Halske AG and which has a very high insulation value. Due to this fact additional protection measures are not required to prevent short circuits between the pairs.

Figure 11:
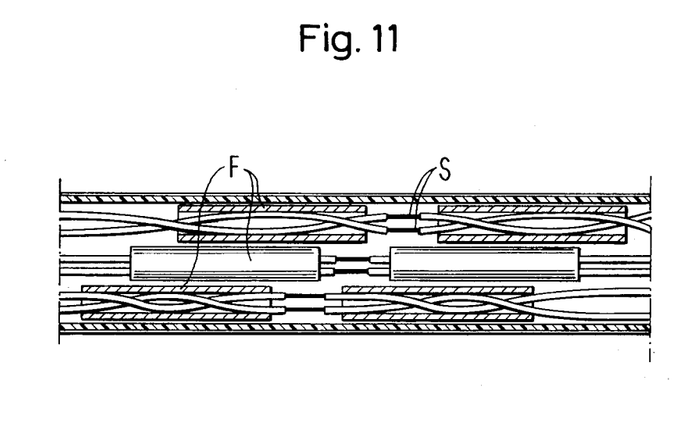
FIG. 11 is a sectional view taken on line C–D from FIG. 12.
Figure 12:
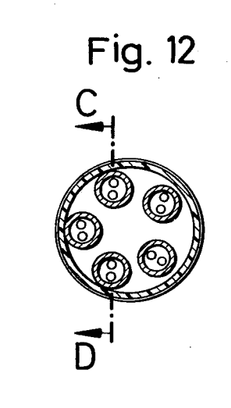
FIG. 12 is an end sectional view of a transmission line.

FIGS. 11 and 12 illustrate a variation of the arrangement of FIGS. 9 and 10 in which the soldering connection points are staggered in the longitudinal direction as shown in FIG. 11. Thus the connection point can be made somewhat smaller in diameter. Since ferrite materials have strongly different weight damping properties depending on the different operational frequency composition and this characteristic of ferrite can be utilized by selecting different ferrite materials, as for example, for the small ferrite cores positioned before or after the individual connection points so as to suppress the unsymmetrical conductor currents over as wide a frequency range as possible and to as far an extent as possible.

In the prior description the invention has been explained in detail by utilizing individual double conductors of the so-called pair form. However it is to be realized that the invention may be applied when the individual pair conductors are arranged in the form of so-called quadruples for instance of the star quadruple since such structures are comprised of two pairs. Thus a ferrite core may include a section of the quadruple and thus may be jointly associated with the pairs of the quadruple. It is however also possible to provide each one of the two pairs of a quadruple with its own small ferrite core. For instance by inserting inductances in each individual pair of a quadruple at fairly high large distances apart not only the unsymmetrical ground currents will be lowered but the quadruple phantom circuits will be interrupted and will be rendered ineffective at large distances with respect to the far cross-talk. It is advantageous that each pair of conductors be formed of core wires of a star quadruple wherein two diametrically opposite wires form the outgoing and return conductors. Such circuits have a smaller expanded outer field compared with pairs and are thus better decoupled than pairs. The outgoing and return conductors may be formed of copper wire and the other wires may be formed of plastic and have no electrical function but serve as fillers for the star quadruple cable.

It is seen that this invention provides means for substantially improving the transmission characteristics of transmission lines by the insertion of inductance cores so as to physically separate and to electrically improve the characteristics of the transmission line. Although the invention has been described with respect to the preferred embodiments it is not to be so limited as changes and modifications may be made which are within the full intended scope as defined by the appended claims.

We claim as our invention:

1. A transmission system for pulse modulation signals such as pulse code modulation signals comprising a plurality of cables that are spliced together end to end and wherein each cable contains a plurality of group conductors and each group conductor contains a plurality of pairs of conductors and wherein different group conductors are utilized for forward and reverse transmission, wherein a plurality of inductances comprising ferrite tubes have openings through which individual ones of said pairs of conductors extend, each of said group conductors surrounded by a shielding cover, and each of said ferrite tubes spaced on said pair of conductors and having a length and cross section which depends on the properties of the ferrite material and have an inductance value L with respect to unsymmetrical conductor currents which approximately are defined by the following equauation:

$$L = \frac{Z}{m \cdot \pi \cdot F_2 \cdot (1 + \frac{1}{N})} \left[ 4\left(\frac{f_2}{f_1}\right)^2 \cdot \frac{l_2}{l_1} \cdot 10^{\frac{a_{f_1} - a_1 - 2(n + a_{s_1} - a_{u_1}) - (a_{u_2} - a_2)}{10}} - 1 \right]^{\frac{1}{2}}$$

where:
$Z$ = Wave resistance for the unsymmetric wave type
$m$ = Number of places of insertion of tubular bi-filar inductances in a continuous conductor path of length $l_2$
$l_1$ = Reference lengths
$f_1$ = Reference frequency
$f_2$ = Highest frequency to be transmitted, whereby the cross-talk demands must be considered
$N$ = Number of pairs of a group
$n$ = 10 lg N
$a_{f_1}$ = direct cross-talk at the frequency $f_1$ via the conductor length $l_1$
$a_1$ = Operational damping of the symmetrically operated pair at the frequency $f_1$ via the conductor length $l_1$
$a_{s_1}$ = Damping of the interference from the ground-symmetric into the ground unsymmetric wave type at the frequency $f_1$ of a pair via the conductor length $l_1$
$a_{u_1}$ Operative attenuation for ground-unsymmetric transmission through a pair over the section length $l$ at the frequency $f_1$
$a_{u_2}$ = Operative attenuation for ground-unsymmetric transmission through a pair over the section length $l_2$ at the frequency $f_2$
$a_2$ = Operative attenuation through a pair over the section length $l_2$ at the frequency $f_2$.

2. A transmission system according to claim 1 wherein said inductances are constructed as bifilar chokes relative to the symmetrical conductor.

3. A transmission system according to claim 2 wherein the individual bifilar chokes consist of a short section of the individual wire pair and a small ferrite tube which is mounted around the wire pair.

4. A transmission system according to claim 1, wherein said individual small ferrite tubes consist of several portions of different ferromagnetic material so that a decrease of the far cross-talk characteristic is obtained over a broad frequency band.

5. A transmission system according to claim 1 wherein two pairs of said pairs of conductors are joined together within their group conductor to form a quadruple.

6. A transmission system according to claim 1 wherein one of said ferrite tubes surrounds each of said pair of conductors of each group conductor adjacent the junction between adjacent pairs of conductors.

7. A transmission system according to claim 1 wherein the pair of conductors are constructed in the form of a quadruple in which two oppositely disposed wires are each formed of plastic wire.

* * * * *